US009969080B2

(12) United States Patent
Buibas et al.

(10) Patent No.: US 9,969,080 B2
(45) Date of Patent: May 15, 2018

(54) ROBOTIC CAMERA SYSTEM

(71) Applicants: Marius O. Buibas, San Diego, CA (US); Martin A. Cseh, San Diego, CA (US); Michael B. Maseda, Las Vegas, NV (US); Nicholas J. Morozovsky, San Diego, CA (US)

(72) Inventors: Marius O. Buibas, San Diego, CA (US); Martin A. Cseh, San Diego, CA (US); Michael B. Maseda, Las Vegas, NV (US); Nicholas J. Morozovsky, San Diego, CA (US)

(73) Assignee: ACCEL ROBOTICS, San Diego, CA (US)

( * ) Notice: Subject to any disclaimer, the term of this patent is extended or adjusted under 35 U.S.C. 154(b) by 22 days.

(21) Appl. No.: 15/226,760

(22) Filed: Aug. 2, 2016

(65) Prior Publication Data
US 2018/0036879 A1 Feb. 8, 2018

(51) Int. Cl.
*G05B 19/00* (2006.01)
*B25J 9/16* (2006.01)
*B25J 19/02* (2006.01)
*H04N 5/225* (2006.01)

(52) U.S. Cl.
CPC ............. *B25J 9/161* (2013.01); *B25J 19/021* (2013.01); *H04N 5/2253* (2013.01); *Y10S 901/01* (2013.01)

(58) Field of Classification Search
CPC ....... B25J 9/161; B25J 19/021; H04N 5/2253; Y10S 901/01
See application file for complete search history.

(56) References Cited

U.S. PATENT DOCUMENTS

| 1,550,944 | A | 8/1925 | Beidler et al. |
| 4,718,519 | A | 1/1988 | Barker |
| 4,934,647 | A | 6/1990 | Edwards |
| 4,964,607 | A | 10/1990 | Lindsay |
| 7,756,322 | B2 | 7/2010 | Saitou et al. |
| 9,776,323 | B2 * | 10/2017 | O'Sullivan ............ B25J 9/1666 |
| 2010/0277584 | A1 | 11/2010 | Price |
| 2015/0304532 | A1 * | 10/2015 | Bart ..................... H04N 5/2252 348/373 |
| 2016/0188977 | A1 * | 6/2016 | Kearns ............... G06K 9/00664 348/113 |

* cited by examiner

*Primary Examiner* — Ian Jen

(57) ABSTRACT

A robot for capturing image frames of subjects in response to a request includes a base, a robot head, a camera, an angular positioning mechanism, a vertical positioning mechanism, and a control system. The base has a transport mechanism for controllably positioning the robot along a lateral surface. The angular positioning mechanism couples the camera to the robot head and controls a tilt of the camera. The vertical positioning mechanism couples the robot head to the base and adjusts a vertical distance between the robot head and the support surface. The control system controls image capture of the camera, the transport mechanism, the angular positioning mechanism, and the vertical positioning mechanism.

20 Claims, 15 Drawing Sheets

ROBOTIC CAMERA SYSTEM

RELATED APPLICATION

This non-provisional patent application claims priority to U.S. Provisional Application Ser. No. 62/210,902, Entitled "Robotic Camera System" by Marius O. Buibas et al., filed on Aug. 27, 2015, incorporated herein by reference under the benefit of U.S.C. 119(e).

FIELD OF THE INVENTION

The present invention concerns a robotic camera system enabling a user to obtain very high quality still and video images. In particular, the robotic camera system provides a convenient way to capture images of the user with or without companions.

BACKGROUND

Users almost invariably capture still frame images and videos when visiting venues such as landmarks, theme parks, zoos, and stadiums or at special events such as birthday parties or other celebrations. Typically the user brings an owned camera to capture images. This can be inconvenient when the user wants self-portraits and/or wants to include all companions in an image frame. SLR cameras with good lenses can be bulky and smartphone cameras are compromised on quality. There is a desire to capture high quality images with more convenience at such venues. There is also a desire to reduce the burden of high quality picture and video capture from a user.

SUMMARY

Figure 1:
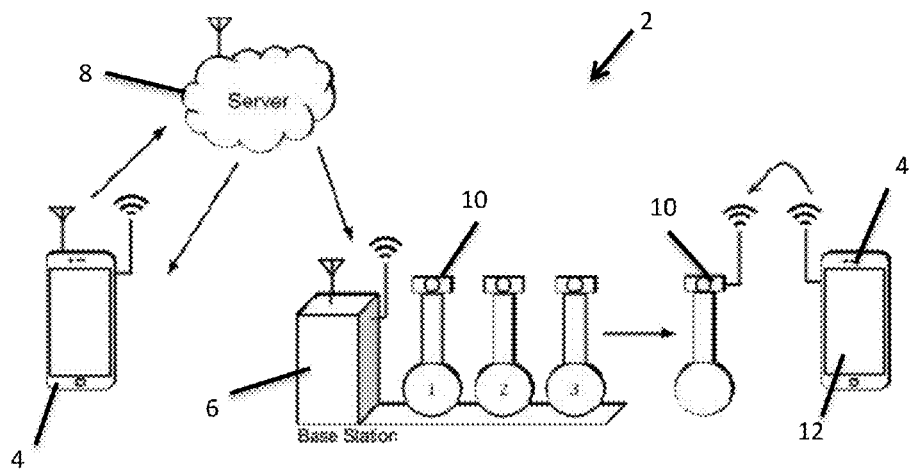
FIG. 1 is a schematic representation of a robotic camera system.

This disclosure concerns the construction, electronics, control, and use of a robot-based camera system for capturing images of subjects in various venues. Reference to "subjects" includes humans as well as animals such as pets, wildlife, and zoo animals. The venues can include commercial establishments such as theme parks, arenas, retail stores, arcades, and restaurants to name a few examples. The venues can also include personal homes and landmarks and are only limited by the configuration and capabilities of the robot.

In one aspect of the disclosure, a robot for capturing image frames in response to a request includes: (1) a base having a transport mechanism that controllably imparts motion and positions the robot along a lateral support surface, (2) a robot head including a camera having a lens defining a camera axis, (3) an angular positioning mechanism that couples the camera to the robot head and controllably adjusts a tilt of the camera axis about a horizontal or lateral axis that is orthogonal to the camera axis, (4) a vertical positioning mechanism that couples the robot head to the base, the vertical positioning mechanism controllably adjusts a vertical or normal distance between the robot head and the support surface along a vertical or normal axis that is orthogonal to the horizontal or lateral axis, and (5) a control system that controls image capture of the camera, the transport mechanism, the angular positioning mechanism, and the vertical positioning mechanism to position the camera in three dimensions and to angularly position the camera axis about at least one axis. In an exemplary embodiment the control system can angularly position the camera axis about two axes. In another exemplary embodiment the control system can angularly position the camera axis about three axes. In a further exemplary embodiment the angular positioning mechanism can controllably adjust the camera axis about two axes. In yet another exemplary embodiment the angular positioning mechanism can controllably adjust the camera axis about three axes.

By moving the camera along three axes and rotating the camera along at least two axes the robot can accommodate a wide range of image capture conditions. Capturing images at or near an eye or face level of a user without tilting the camera improves the quality of facial and eye images captured. This is enabled by the use of the vertical positioning mechanism.

In one implementation the base includes a stabilizing mechanism that stabilizes the robot upon the support surface in response to control signals from the control system. In an exemplary embodiment the stabilizing mechanism includes extendable legs that extend to and retract from the support surface in response to control signals from the control system.

Having a separate stabilizing mechanism allows the robot to capture high quality images on uneven surfaces or sloped surfaces. High quality images can also be captured under windy conditions.

In another implementation the transport mechanism includes three omni-directional wheels that contact the support surface and are rotated to provide lateral transport for the robot as well as rotation about a normal axis. The direction of rotation and rotational speed of each omni-directional wheel can be controlled independently, imparting net motion of the transport mechanism in any lateral direction, with or without rotation about a normal or vertical axis.

In yet another implementation the vertical positioning mechanism can vary the distance between the base and the robot head by at least a factor of two. In a second exemplary embodiment the vertical positioning mechanism can vary the distance between the base and the robot head by at least a factor of three. In a third exemplary embodiment the vertical positioning mechanism can vary the distance between the base and the robot head by at least a factor of four. In a fourth exemplary embodiment the vertical positioning mechanism can vary the distance between the base and the robot head by at least a factor of five. In a fifth exemplary embodiment the vertical positioning mechanism can vary the distance between the base and the robot head by at least a factor of seven. In a sixth exemplary embodiment the vertical positioning mechanism can vary the distance between the base and the robot head by at least a factor of ten.

Having a large vertical motion of the camera head relative to the base allows the camera axis to be nearly horizontally positioned while accommodating a wide range of user heights. The best quality pictures are possible when the camera axis height is as close to the height of an eye or face level of a photographic subject as possible. When there is more than one subject, the optimal height of the camera axis is near the center of a range of eye or facial heights for the subjects. A height H is defined as the adjusted vertical distance from the support surface to the camera axis. In one embodiment H can be varied by a factor of at least 2. In another embodiment H can be varied by a factor of three. In an exemplary embodiment H can vary from a low value of 18 inches to a high value of 60 inches. This allows the robot to accommodate a wide range of photographic subjects including small children and tall adults. The low value of H also minimizes the height of the robot for purposes of storage and/or vehicular transportation.

In a further implementation an imaging system (the camera and the controller) operate to automatically find an optimal height H for the robot. The camera captures an image of one or more faces of subjects (human and/or animals) to be photographed. The imaging system processes the image to find a vertical height H that corresponds to an eye level, a point on a face, or a computed height H that is substantially central to a vertical range that contains all eyes or faces of plural subjects. The controller raises or lowers the camera until the camera axis reaches the height H.

The combination of enabling a wide range of heights for the camera axis and the automated image capture and adjustment is an important and unique aspect of the robot. This enables capture of optimal portrait for any given group of subjects without user intervention.

In another implementation the vertical positioning mechanism includes a scissor mechanism including a plurality of connected scissor links whereby a relative angular rotation of connected scissor links determines the vertical distance between the robot head and the base. In one embodiment each scissor link includes a pair of opposing ends and further comprising a plurality of vertex members, each vertex member is joined to the ends of at least two of the scissor links. In a more particular embodiment the plurality of vertex members includes a plurality of driven vertex members, each driven vertex member is coupled to the ends of two different scissor links whereby synchronous linear motion of the driven vertex members imparts the angular rotation of the scissor links. In yet a more particular embodiment the vertical positioning mechanism includes a pulley system that drives the synchronous linear motion of the driven vertex members under control of the control system. In another particular embodiment the plurality of vertex members includes a plurality of intermediate vertex members, each intermediate vertex member is coupled to the ends of four different scissor links. In a further particular embodiment the plurality of driven vertex members includes three driven vertex members whose synchronous horizontal motion is along axes that vary by 120 degrees from each other. In another particular embodiment the scissor mechanism defines a prismatic shape having at least three surfaces. In yet another particular embodiment the scissor mechanism defines a shape of a triangular prism.

The scissor lift mechanism is what enables the large range for the height H for the robot. The triangular prism shape also provides a very stable support for a camera.

In another aspect of the disclosure, a robotic camera system includes a cloud server in wireless communication with a base station and a user's mobile device. The base station contains a plurality of robots. The robotic camera system collectively includes computer-readable instructions stored on a non-transitory medium. When executed by processors the instructions perform a computer implemented method including the following steps: (1) receiving a request from a user's mobile device, (2) identifying an available robot at the base station, (3) sending matching digital certificates to the mobile device and to the available robot, (4) the robot disconnecting from the base station wireless network, (5) the robot forming a wireless hotspot accessible by the user's mobile device, (6) the robot wirelessly connecting to the user's mobile device, (7) the robot handshakes with the user's mobile device using the digital certificates whereby the user's mobile device assumes at least partial control of the robot. In an exemplary embodiment the digital certificates have an expiration time and the steps further include the robot wirelessly disconnecting from the user's mobile device when the digital certificates expire.

In one implementation the instructions define a particular route through a venue. The computer-implemented method performed by the instructions further includes leading and guiding the user along the particular route. In one embodiment the instructions further define locations along the particular route and the computer implemented method further includes the robot automatically stopping to allow the capture of image frames at the locations.

In another implementation the instructions define a particular route through a venue and the computer implemented method further includes leading and guiding the user along the particular route.

In a further implementation the instructions define a predefined area within a venue and the computer implemented method further includes the robot returning to the base station if the user leaves the predefined area.

In yet another aspect of the disclosure, a robot for capturing image frames in response to a request includes: (1) a base having a transport mechanism that controllably imparts motion and positions the robot along a lateral support surface, (2) a robot head including a camera having a lens defining a camera axis, (3) an angular positioning mechanism that couples the camera to the robot head and adjusts an angle between the camera axis and a horizontal or lateral axis, (4) a vertical positioning mechanism that couples the robot head to the base, the vertical positioning mechanism controllably adjusts a vertical or normal distance (H) between the robot head and the support surface, and (5) a control system that controls the transport mechanism, the angular positioning mechanism, and the vertical positioning mechanism, the control system including a non-transitory medium storing computer-readable instructions that, when executed, perform the following steps: (a) receiving information indicative of a photo session request, (b) capturing an image frame that at least bounds the face or eyes of one or more photographic subjects, (c) analyzing the image frame to determine locations of the face or eyes of the one or more photographic subjects, and operating the vertical positioning mechanism to optimize the height of the camera lens relative to the face or eyes of the one or more photographic subjects. In an exemplary embodiment, the vertical positioning mechanism is a scissor lift mechanism that allows H to be varied over a range from 24 inches to 60 inches or from 18 inches to 60 inches. In another exemplary embodiment, the photo session request originates from one of (1) a user's mobile device (e.g., smartphone), (2) an input to a user interface that is mounted to the robot, (3) depression of a button on the robot, (4) a finger input to a touchscreen mounted to the robot, and (5) an automatic response from an image processing system in the camera and/or the controller. In yet another exemplary embodiment, optimizing the height of the camera includes adjusting H to a value whereby the camera axis vertically corresponds to a height that is centrally located relative to the face or eyes of the one or more photographic subjects whereby the camera axis can be horizontal. A combination of a scissor lift mechanism that enables a wide range of values for H and an automated image capture and analysis and adjustment system enables a very user friendly way to obtain professional quality photographs.

In one implementation the robot further includes a plurality of LEDs located proximate to the lens and the computer-readable instructions further perform the step of modulating the LEDs prior to capturing the image frames.

DETAILED DESCRIPTION OF THE PREFERRED EMBODIMENTS

This description concerns a robot-based camera system. In use the robot is typically placed upon a support surface which can be a floor or walkway. In the disclosure various geometric terms such as vertical, lateral, normal, and horizontal are used. Vertical generally means aligned with a gravitational reference. Horizontal is perpendicular to vertical. Lateral generally refers to a direction along the support surface and the normal direction is perpendicular to the support surface (or at least the portion of the support surface upon which the robot rests). Mutually orthogonal geometric axes X, Y, and Z are also used. These axes refer to directions that are internal to a robot-based camera system. In some cases the Z axis may be aligned with the vertical (gravitational) axis. But if the robot is placed upon a sloping support surface then Z may not be vertical. The axes X and Y can be horizontal or lateral.

FIG. 1 depicts an exemplary robotic camera system 2. Robotic camera system 2 can be utilized in various venues such as a theme park, a zoo, a museum, a historical site, and a landmark viewing area to name a few examples. What the venues have in common is a desire of the user to be able to capture images and videos of the user, the user's companions, and the scenes of the venue itself alone and/or in combination.

Robotic camera system 2 includes a mobile device 4 and base station 6 that are wirelessly linked to a cloud server 8. Base station 6 houses a plurality of robots 10. Prior to use the robots 10 are wirelessly coupled to base station 6. When in use a robot 10 becomes wirelessly linked to a user's mobile device 4. In an exemplary embodiment the wireless links of robotic camera system 2 utilize an IEEE 802.11 standard protocol. Mobile device 4 includes a mobile robot application 12 to be utilized by the user for controlling robot 10.

The mobile device 4 includes a processor and a non-transitory information storage device that stores computer executable instructions to be executed by the processor. The computer executable instructions define the mobile robot application 12 along with an operating system and other applications.

In one embodiment the base station 6 also incorporates one or more photo printers to provide physical prints of images captured by robot 10. The photo printers can print a wide range and variety of sizes from small wallet sizes to large format images suitable for a poster or large frame. In yet another embodiment the robot 10 incorporates a photo printer.

Robotic camera system 2 performs various functions including those described with respect to FIGS. 8, 9, 10, 11, and 12. The functions are performed utilizing computers that are embedded in mobile device 4, base station 6, cloud server 8, and in robots 10. The computers each individually and collectively include non-transitory media that store software instructions. When the software instructions are executed by the computers, the functions are performed as described. It is anticipated that certain steps among those that define these functions can be performed by more than one of the computers. For example, an image processing or image analysis function could be performed by the computer within mobile device 4, the computer within robot 10, or the computer within cloud server 8. Unless specified by the following, there is no necessary limitation as to which processor or combination of processors is performing the function.

Figure 2:
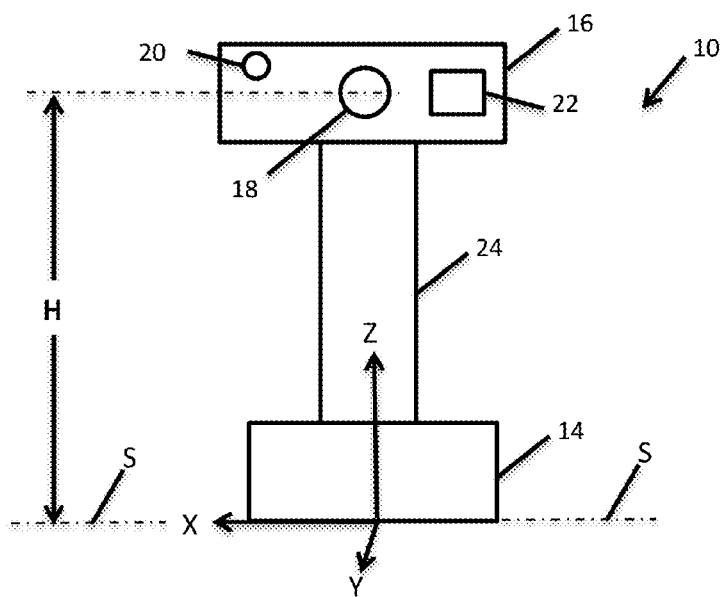
FIG. 2 is a schematic representation of an exemplary robot for capturing image frames.

FIG. 2 is a schematic drawing of an exemplary robot 10 and its configuration with various functional components. Robot 10 includes base 14 that is in contact with a support surface S. Base 14 provides various functions including transport along the support surface S and stability upon the support surface S. Transport can be provided by various devices such as motorized wheels. In an exemplary embodiment transport is provided by a mechanized ball. Stability can be provided by various devices such as stabilizing legs and/or locking wheels. In an exemplary embodiment stability is provided by motorized extendable legs.

In an alternative embodiment the transport is provided by mechanized wheels or casters or omni-directional wheels. The wheels can also be locked to provide the function of the stabilizing legs. In a more particular alternative embodiment the base 14 includes three such omni-directional wheels that move in concert to provide lateral transport for robot 10 along surface S.

Robot 10 includes a robot head 16 that includes camera 18, microphone 20, and user communication devices 22. Camera 18 can be configured for capturing still frame images or video. Microphone 20 is for capturing audio information and is synchronized with camera 18. User communication devices 22 are for visual and/or audio communication from the robot 10 to the user. Examples of communication devices 22 include LEDs (light emitting diodes), audio speakers, and other devices for direct communication from the robot 10 to the user. Robot 10 may also communicate indirectly to the user via the user's mobile device 4.

Robot 10 includes a vertical positioning mechanism 24 that couples the robot head 16 to the base 14. Vertical positioning mechanism 24 is mechanized to enable automated or semi-automated control of the vertical position H of camera 18 relative to the support surface S. The vertical positioning mechanism 24 can take on a number of forms such as telescoping cylinders, rack and pinion systems, and lead screw-driven systems to name a few examples. In an exemplary embodiment vertical positioning mechanism includes a scissor link based mechanism.

FIG. 2 depicts mutually perpendicular axes X, Y, and Z relative to robot 10. Axes X and Y can be horizontal axes. Axis X is perpendicular to a camera axis CA of camera 18 (see FIGS. 3A, 3C, and 6). Axis Y can be parallel to the camera axis CA unless camera 18 is tilted about axis X. If the camera is tilted about axis X then the camera axis CA will extend along axes Y and Z. Axis Z is central to the vertical positioning mechanism 24 and can coincide with a gravitational reference. If base 14 is positioned upon a sloping and/or curved support surface S, then axes X and Y may not be horizontal and axis Z may not be vertical.

In an alternative embodiment the base 14 is fixed such that robot 10 is immobile. In this embodiment the functions of robot head 16 and vertical positioning mechanism 24 are similar to that described with respect to FIG. 2.

Figure 3A:
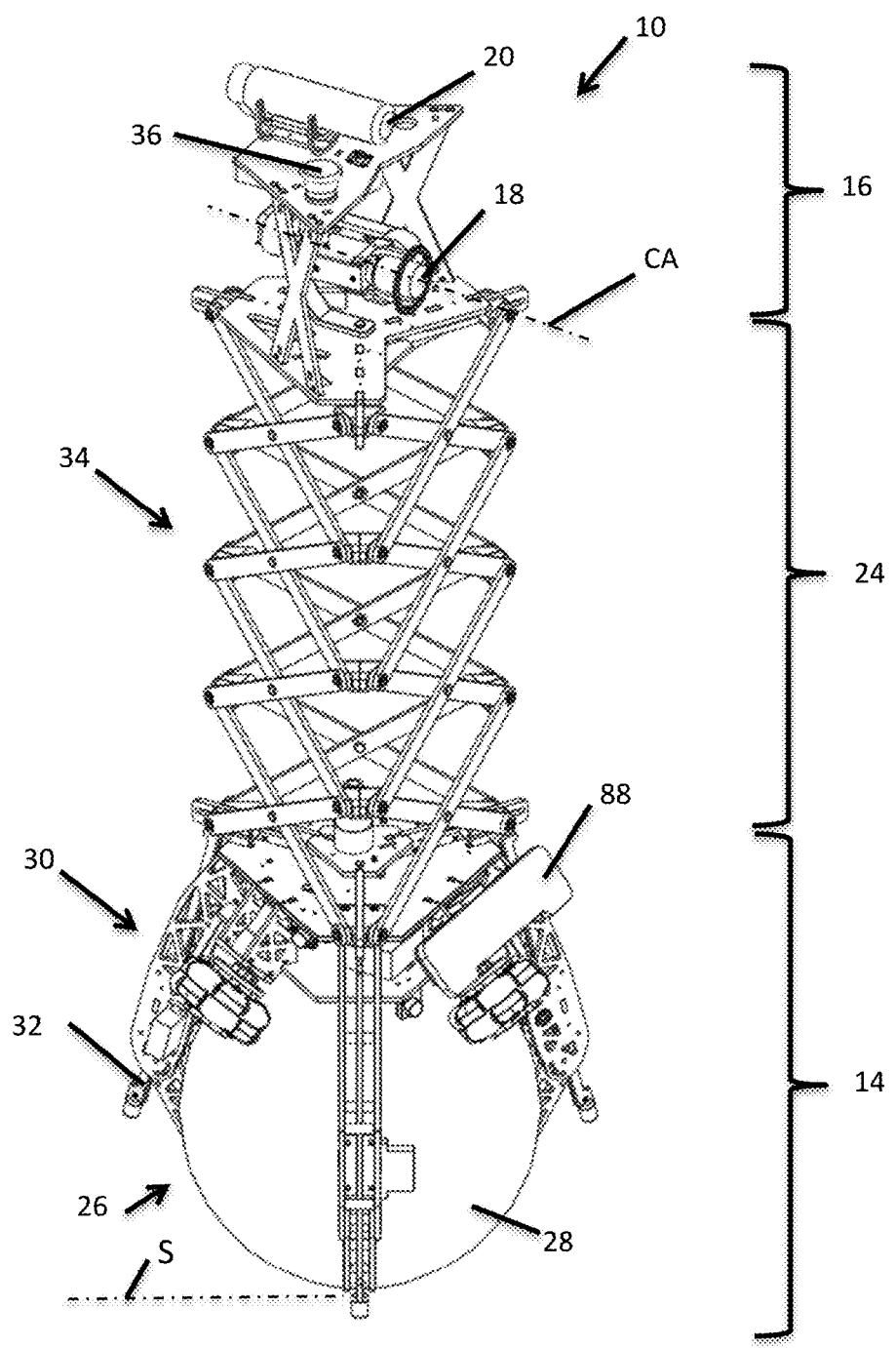
FIG. 3A is an isometric representation of a first exemplary embodiment of a robot for capturing image frames.
Figure 3B:
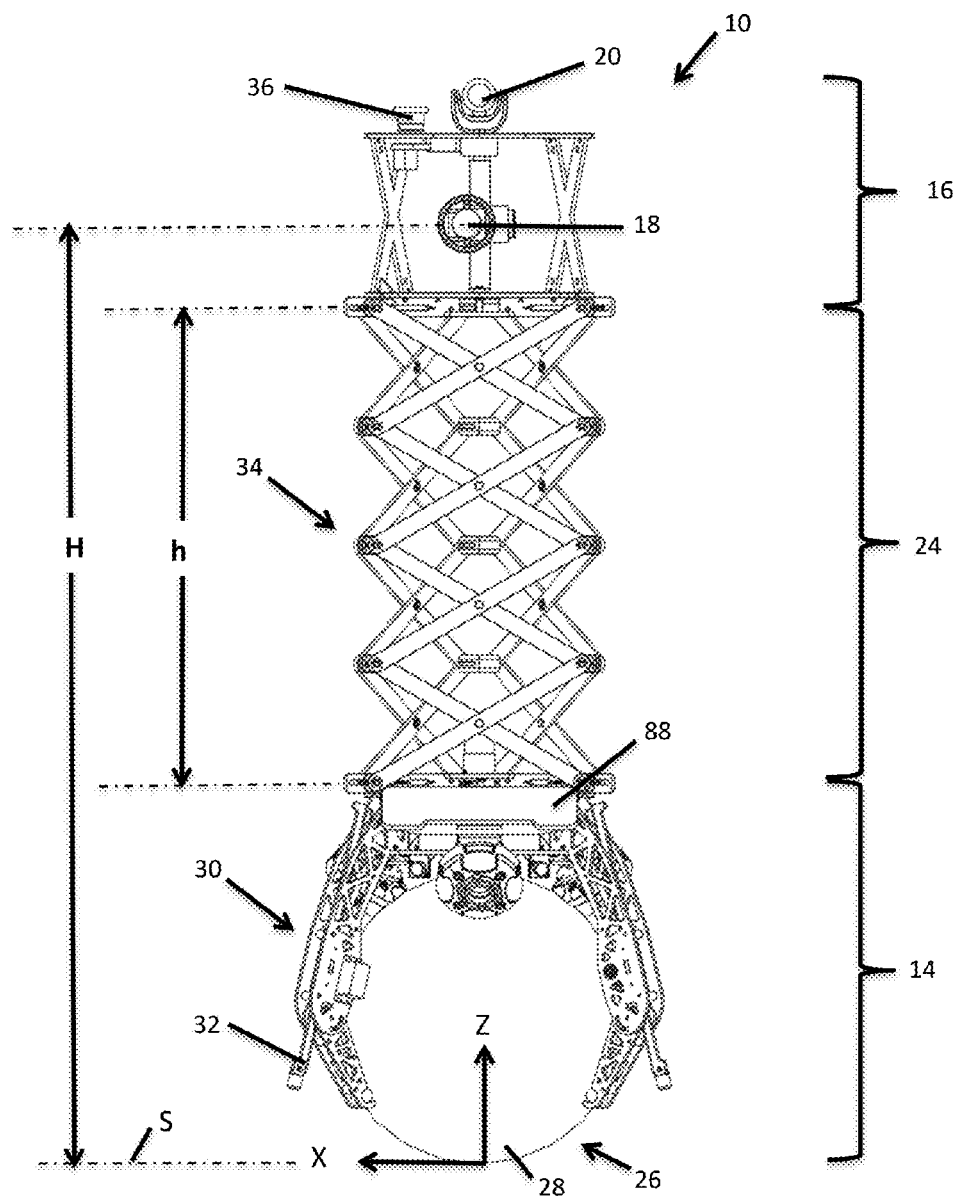
FIG. 3B is a front view of a first exemplary embodiment of a robot for capturing image frames.
Figure 3C:
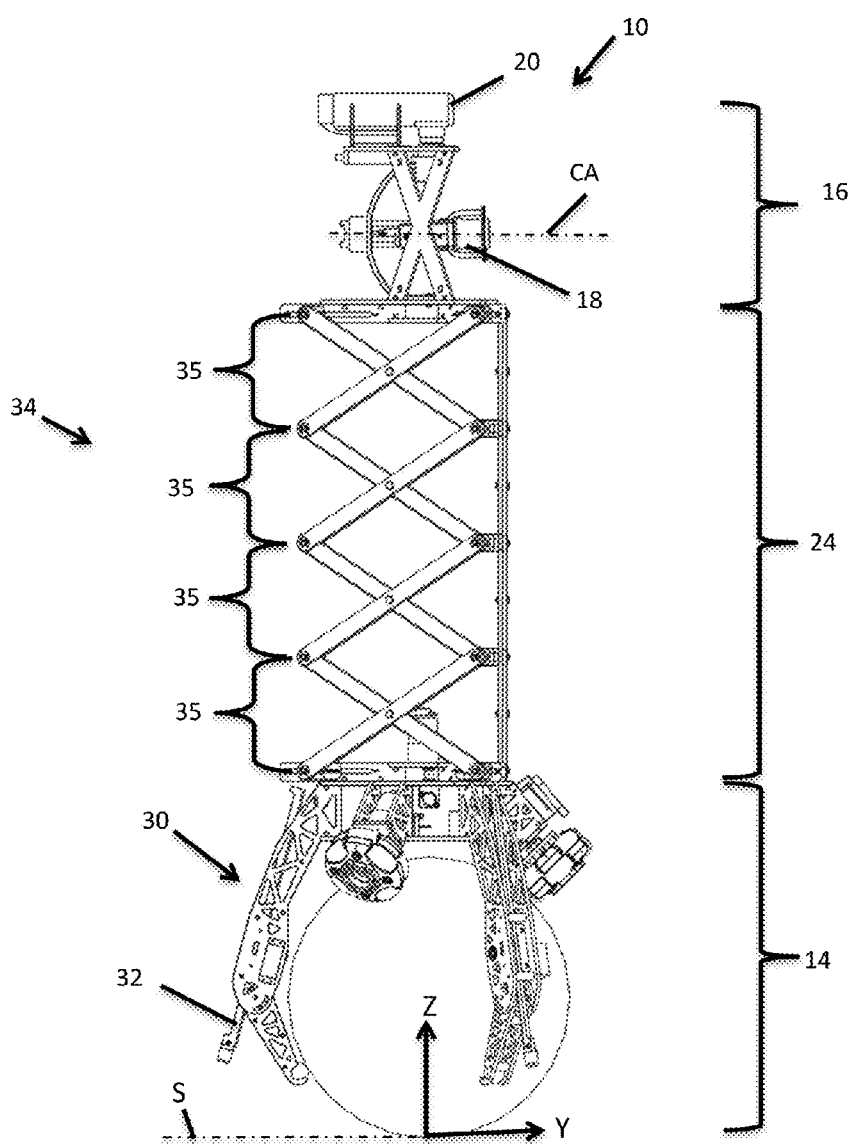
FIG. 3C is a side view of a first exemplary embodiment of a robot for capturing image frames.

FIGS. 3A-3C are different views depicting a first exemplary embodiment of robot 10. FIG. 3A is an isometric view. Base 14 includes a transport mechanism 26 including a ball 28 that is controllably rotated with respect to axes X, Y, and Z. Rotation of ball 28 about axes X and Y imparts lateral motion of base 14 across the support surface S. Rotation of ball 28 about axis Z rotates camera 18 about the central axis Z.

Base 14 also includes a stabilizing mechanism 30 that includes three extendable legs 32. Each extendable leg 32 can be extended by a rack and pinion drive. When the robot 10 becomes stationary for picture-taking, the stabilizing mechanism 30 can maintain stability even on a sloped or uneven support surface S. Base 14 also includes speaker 88 that can be used to communicate with users and photographic subjects.

Vertical positioning mechanism 24 includes a scissor mechanism 34. In the illustrated embodiment scissor mechanism 34 is a triangular scissor mechanism 34 that advantageously exhibits superior strength with the least complexity for the disclosed application. The scissor mechanism 34 will be discussed further with respect to FIGS. 4 and 5.

Robot head 16 supports camera 18 and microphone 20. Also depicted is camera axis CA that is centered upon the camera lens axis of camera 18. Also positioned on robot head 16 is emergency stop (E-Stop) 36 for shutting down robot 10.

In an alternative embodiment a microphone 20 (not shown) is integrated into camera 18. Then there is no need for a separate microphone 20. In another alternative embodiment there is no emergency stop 36.

FIG. 3B is a front view of robot 10 from the perspective of a user facing camera 18. The user faces the camera along the Y-axis which corresponds to the camera axis CA in this figure because the camera 18 is not tilted with respect to axis X. To the user facing the camera, the X axis extends to the "left and right" and the Z axis is vertical. The height h is defined as a vertical distance along the Z-axis between base 14 and robot head 16 that is spanned by scissor mechanism 34. Also shown is the height H defined as a vertical distance along the Z-axis between the camera axis CA and the support surface S.

FIG. 3C is a side view of robot 10. In this illustration the camera axis CA is coincident with the Y-axis. However, robot head 16 includes an angular positioning mechanism 64 (visible FIG. 6) for controllably tilting camera 18 with respect to the X-axis so that the camera axis CA can define an angle with respect to the Y-axis.

Figure 4:
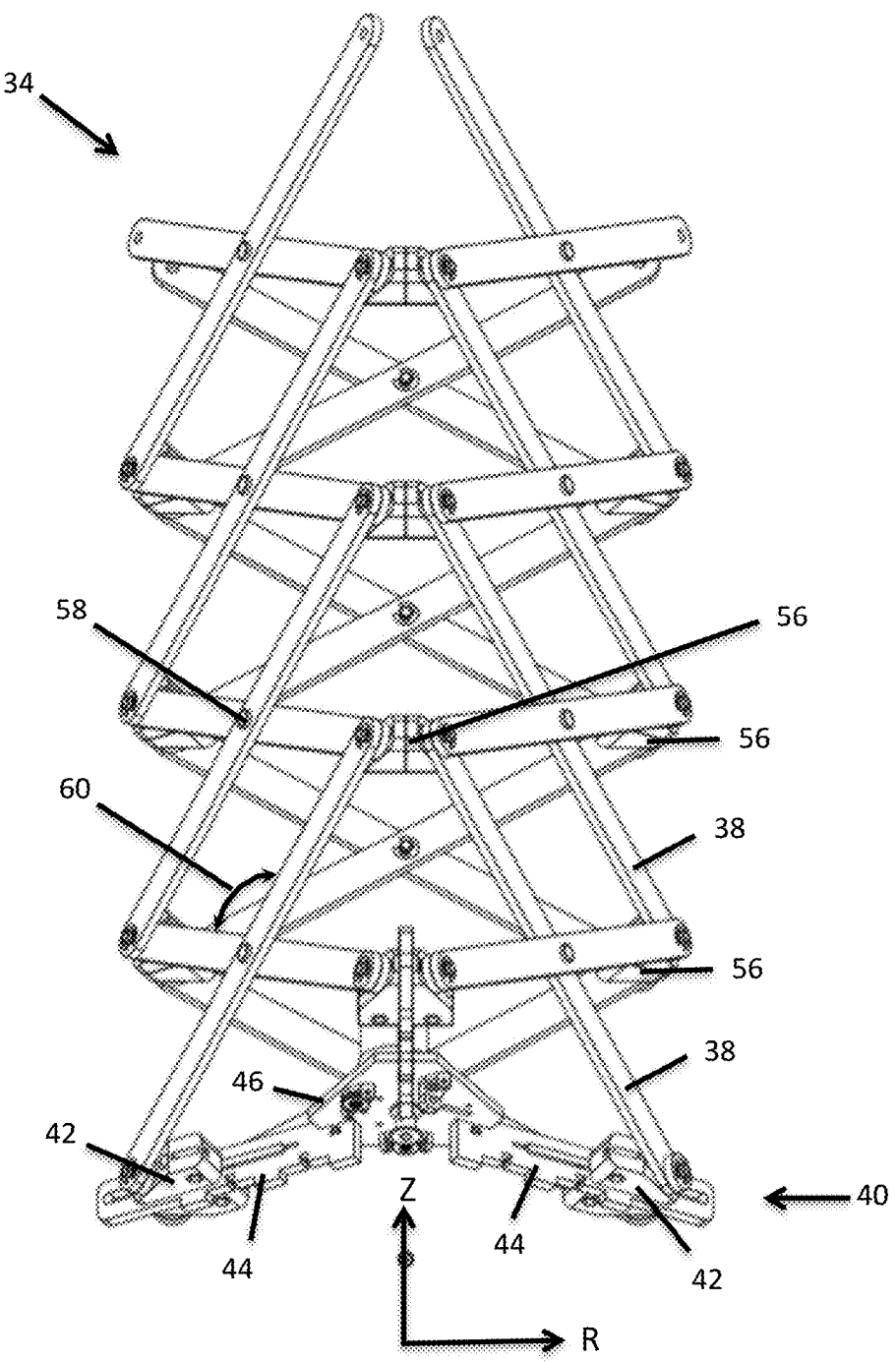
FIG. 4 is an isometric view of a triangular scissor lift mechanism.
Figure 5:
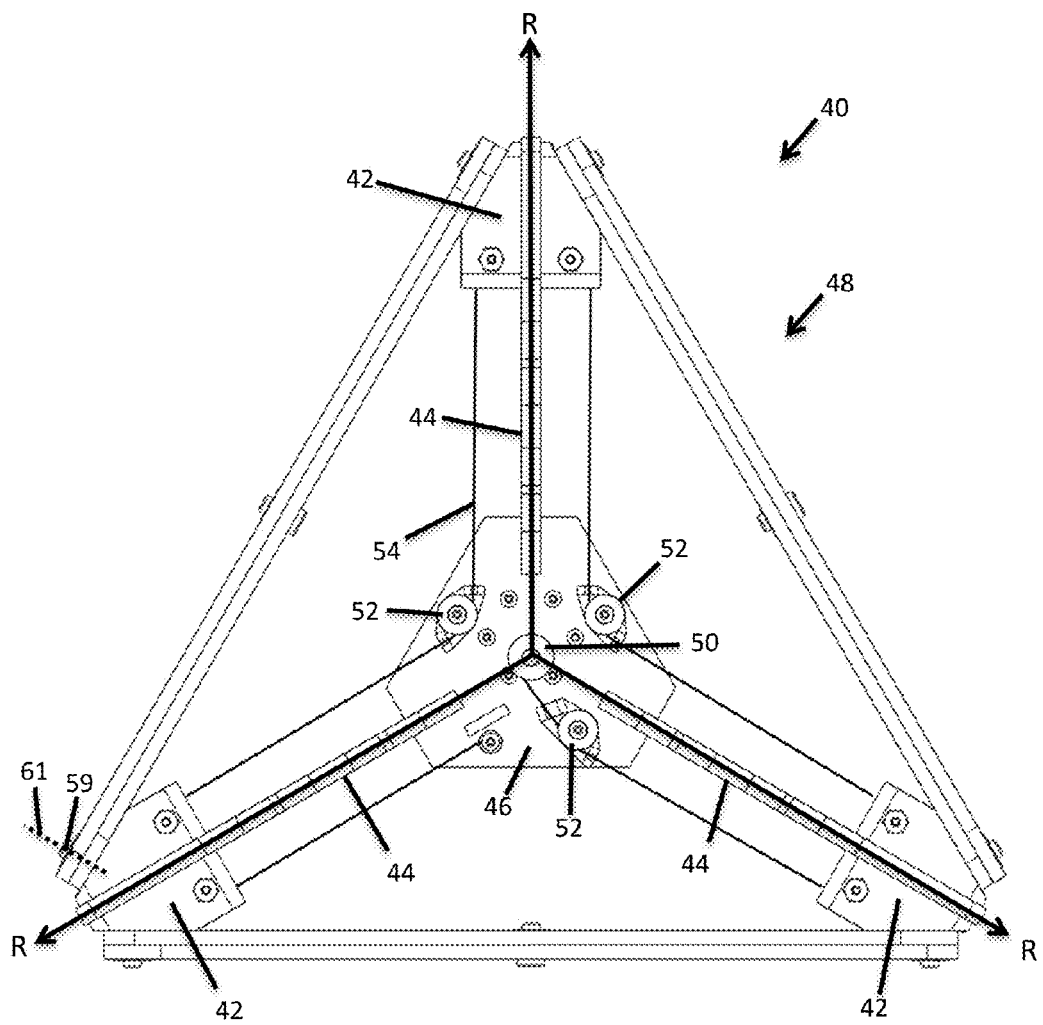
FIG. 5 is a lower end view of a triangular scissor lift mechanism.

FIG. 4 is an isometric illustration depicting the scissor mechanism 34 in isolation. Scissor mechanism 34 includes interconnected scissor links 38 coupled to a link drive mechanism 40. Link drive mechanism 40 is further illustrated in FIG. 5 which is a view looking upward in Z. The direction R is radial with respect to axis Z.

Link drive mechanism 40 includes three driven vertex members 42 that are each slidably mounted to a slotted track 44. Each driven vertex member 42 is constrained by its corresponding slotted track 44 to linearly translate inwardly and outwardly along radial axis R. The three slotted tracks 44 are disposed at an angle of 120 degrees with respect to each other and are connected to a central plate 46. Thus the three driven vertex members 42 each move on linear radial paths that differ from each other by a 120 degree angle. Each driven vertex member 42 is rotatably coupled to two scissor links 38.

To impart motion to the three driven vertex members 42 a pulley system 48 including a central pulley 50, intermediate pulleys 52 and a cable 54 are configured to apply an inwardly radial force (−R) onto the driven vertex members 42 that is equal to substantially twice the tension in the cable 54. The inward radial (−R) force is opposed by weight bearing down on the scissor mechanism 34 from the weight of the scissor mechanism 34 itself and the load on the scissor mechanism 34 which has the effect of urging the driven vertex members 42 radially outward (+R).

When the central pulley 50 overcomes the radially outward force and pulls the driven vertex members 42 inwardly (−R), the scissor links 38 extend upwardly, increasing the length h of the scissor mechanism 34 along the Z-axis. This raises the robot head 16 holding camera 18. The central pulley 50 disposed near the center of the central plate 46 can be actuated by a motor.

Each scissor link 38 that is rotatably attached to a driven vertex member 42 (driven by pulley system 48) is also rotatably attached to an intermediate vertex member 56 at an opposing end of the scissor link 38. Each driven vertex member 42 is coupled to two different intermediate vertex members 56 via two scissor links 38. Each intermediate vertex member 56 is coupled to four different vertex members (42 or 56) including two vertex members (42 or 56) above and two vertex members (42 or 56) below. Each scissor link 38 is also rotatably coupled to another scissor link 38 at an intermediate pivot 58 between opposing ends of the scissor link 38. Each pair of rotatably coupled scissor links 38 define a vertical angle 60 therebetween. The vertical angle 60 for each pair decreases as the driven vertex members 42 are pulled inwardly (−R) thereby increasing the Z-height of the entire scissor mechanism 34. This raises the camera 18.

Each vertex member (42 or 56) is coupled to two or four scissor links 38 at an end pivot 59 which is at one of the opposing ends of a scissor link. The end pivot 59 defines an axis of rotation 61 that defines a sixty degree angle with respect to radial axis R.

While a pulley system 48 is shown for moving the driven vertex members 42, other systems are possible. In one alternative embodiment the driven vertex members are driven radially by motorized lead screws. In another alternative embodiment the driven vertex members are driven by a centrally located motor-driven cam.

Referring back to FIG. 3B, in a first exemplary embodiment the scissor mechanism 34 can vary the distance h between the base 14 and the robot head 16 by a factor of at least two. In a second exemplary embodiment the scissor mechanism 34 can vary the distance h between the base 14 and the robot head 16 by a factor of at least three. In a third exemplary embodiment the scissor mechanism 34 can vary the distance h between the base 14 and the robot head 16 by a factor of at least four. In a fourth exemplary embodiment the scissor mechanism 34 can vary the distance h by a factor of at least five. In a fifth exemplary embodiment the scissor mechanism 34 can vary the distance h by a factor of at least seven. In a sixth exemplary embodiment the scissor mechanism 34 can vary the distance h by a factor of at least ten.

The overall shape of the scissor mechanism 34 defines a three-sided prism. Such a scissor mechanism 34 is much more mechanically stable than more conventional two sided scissor mechanisms. Other designs are possible such as four-sided prisms and prisms with more than four sides. However, a greater number of sides increases the complexity and cost of the scissor mechanism 34.

As is clear in side view FIG. 3C, the exemplary scissor mechanism 34 illustrated in FIGS. 3A-C has four scissor stages 35. In this view, each stage 35 appears as a crossed pair of scissor links 38. However, because scissor mechanism 34 is actually a three-sided prism, each stage 35 includes three pairs of crossed scissor links. In alternative embodiments, different numbers of scissor stages can be employed. In the alternative embodiment illustrated in FIGS. 13A-C there are five scissor stages 35.

Figure 6:
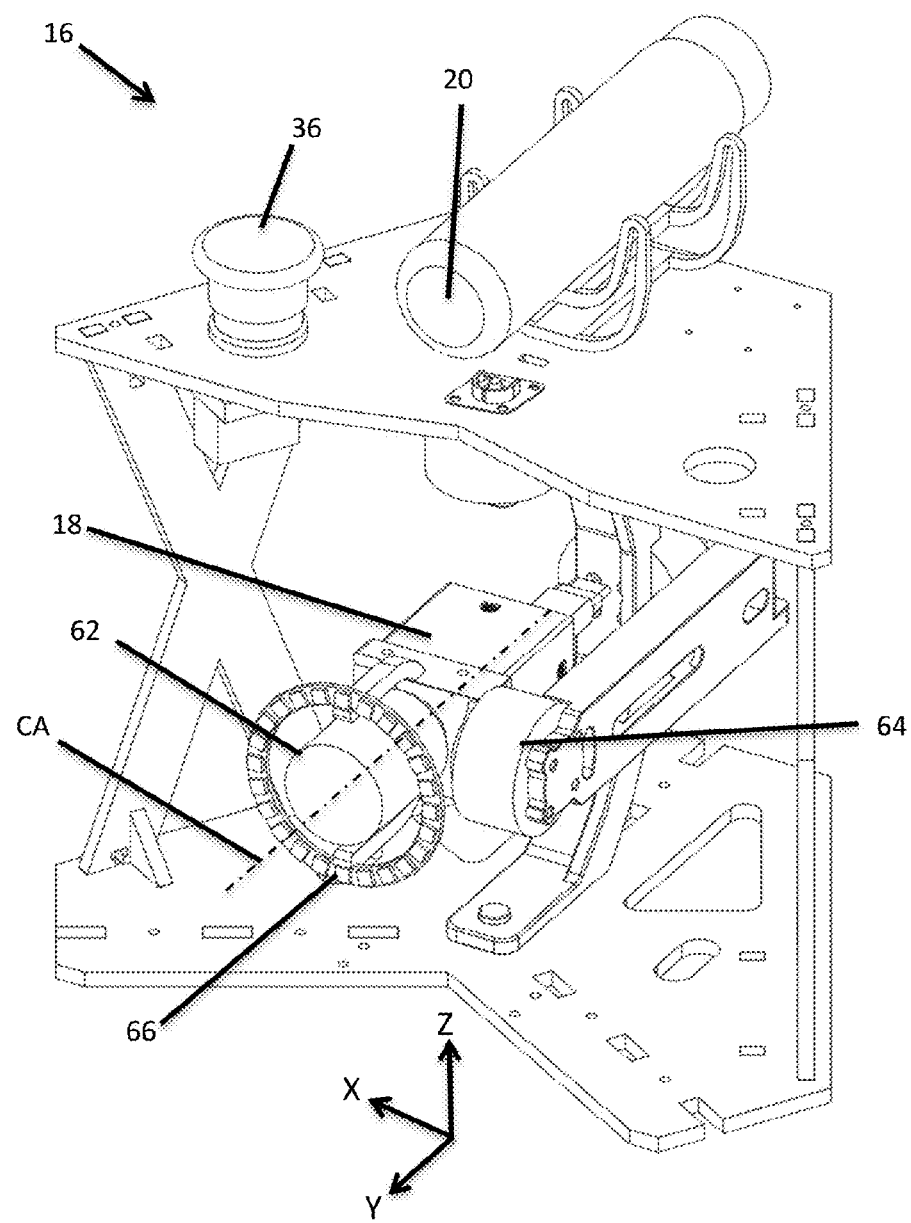
FIG. 6 is an isometric view of a robot head that supports a camera and microphone.

FIG. 6 is an isometric illustrating an exemplary embodiment of robot head 16 in isolation with camera 18 having camera lens 62. Camera 18 is mounted to be controllably rotated about each of axes X, Y, and Z. Angular positioning mechanism 64 couples camera 18 to robot head 16. Angular positioning mechanism 64 controllably adjusts rotation of the camera 18 about the axis X. Therefore angular positioning mechanism 64 controllably adjusts an angle between the camera axis CA and the Y axis. Transport mechanism 26 (FIGS. 3A and 3B) controllably adjusts rotation of the camera 18 about axis Z.

In another exemplary embodiment angular positioning mechanism 64 is configured to controllably adjust rotational positioning of camera 18 about axes X and Y (or about the camera axis CA). In yet another embodiment the angular positioning mechanism 64 is configured to controllably adjust the rotational positioning of camera 18 about axes X (pitch), Y (roll), and Z (pan). Rotation about the X-axis is the pitch, rotation about the Y-axis is the roll, and rotation about the Z-axis is pan.

Surrounding the lens of camera 18 is a ring of LEDs 66 (light emitting diodes). The ring of LEDs 66 can be controllably used to gain attention of a user and associated companions that a still frame is about to be captured. The ring of LEDs 66 can also be used to indicate that camera 18 is capturing video frames or that a countdown timer or time lapse feature has been activated and to show the passage of time.

In an alternative embodiment robot 10 is fixed in location. Otherwise robot head 16 and vertical positioning mechanism 24 are similar. In this alternative embodiment the camera 18 can be rotated along axes X, Y, and Z by angular positioning mechanism 64. Camera 18 can be raised and lowered along Z by vertical positioning mechanism 24.

Figure 7:
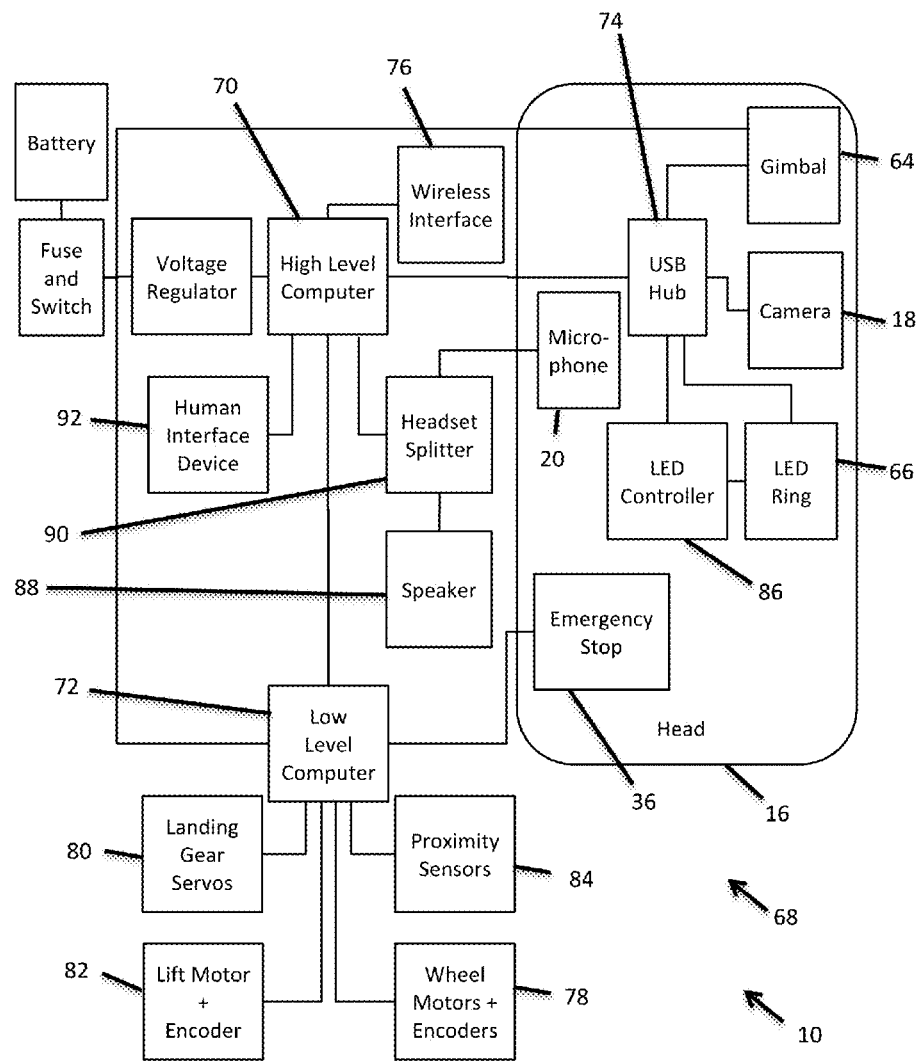
FIG. 7 is a simplified electrical block diagram of an exemplary embodiment of a robot for capturing image frames.

FIG. 7 is a simplified electrical block diagram for an exemplary robot 10. Where applicable, element numbers in the electrical block diagram of FIG. 7 will correspond to element numbers in prior diagrams. For example, the camera 18 in FIG. 7 is the electrical block representation of the camera 18 from FIG. 6 or other prior figures.

Robot 10 has a control system 68 that is defined as an exemplary system of higher and lower level computers, controllers, interface devices, and other devices that control the components of robot 10 to provide transport along support surface S, stability, rotation along various axes, and internal control of individual components. Control system 68 includes but is not necessarily limited to high level computer 70, low level computer 72, and USB hub 74.

High level computer 70 is coupled to wireless interface 76. Wireless interface 76 couples high level computer to mobile device 4 (FIG. 1). Thus the mobile robot application 12 can control robot 10 through the communication of mobile device 10 with high level computer 70 via wireless interface 76.

High level computer 70 controls low level computer 72 which is coupled to, receives signals from, and/or controls wheel motors and encoders 78, landing gear servos 80, lift motor and encoder 82, and proximity sensors 84. Motors and encoders 78 are configured to control motion of ball 28 to provide lateral transport of robot 10 along support surface S. Landing gear servos 80 control the raising and lowering of extendable legs 32 to stabilize robot 10 upon support surface S. Lift motor and encoder 82 provide controlled rotation of central pulley 50 for raising and lowering camera 18. Proximity sensors 84 provide signals indicative of obstacles, humans, or animals to allow robot 10 to avoid collisions or inflicting injuries.

High level computer 70 controls and/or receives signals from camera 18, angular positioning mechanism 64, and LED ring 66 through USB hub 74. Between USB hub 74 and LED ring 66 is LED controller 86 for converting computer commands from high level computer 70 to control signals for LED ring 66.

High level computer 70 is coupled to microphone 20 and to speaker 88 through headset splitter 90. High level computer 70 receives manually entered commands through human interface device 92.

An alternative embodiment utilizes three omni-directional wheels instead of the ball 28. This embodiment does not include the landing gear servos 80. The wheel motors and encoders 78 directly control the omni-directional wheels which will be illustrated with respect to FIGS. 13A-C.

In another alternative embodiment the emergency stop 36 and microphone 20 are eliminated. In this embodiment a microphone 20 is integrated into the camera 18.

In yet another embodiment the camera 18 is wirelessly coupled to high level computer 70. In a further embodiment the LED ring can be directly coupled to another component such as the low level computer 72 or the high level computer 70. In a yet further embodiment the wireless interface 76 is directly coupled to the USB hub 74 rather than to the high level computer 70. As can be seen, various embodiments are possible for coupling components and routing information.

The camera 18, high level computer 70, and possibly other devices collectively define an image processing system. The image processing system includes hardware and software for processing an image received by camera 18. As such, it can reside individually in camera 18, individually in high level computer 70, individually in mobile device 4, individually in some other device (not shown), or collectively in more than one device. The image processing system can analyze images that are received by camera 18 to recognize eye, faces, and/or other features of subjects (human and/or animal) to be photographed.

Figure 8:
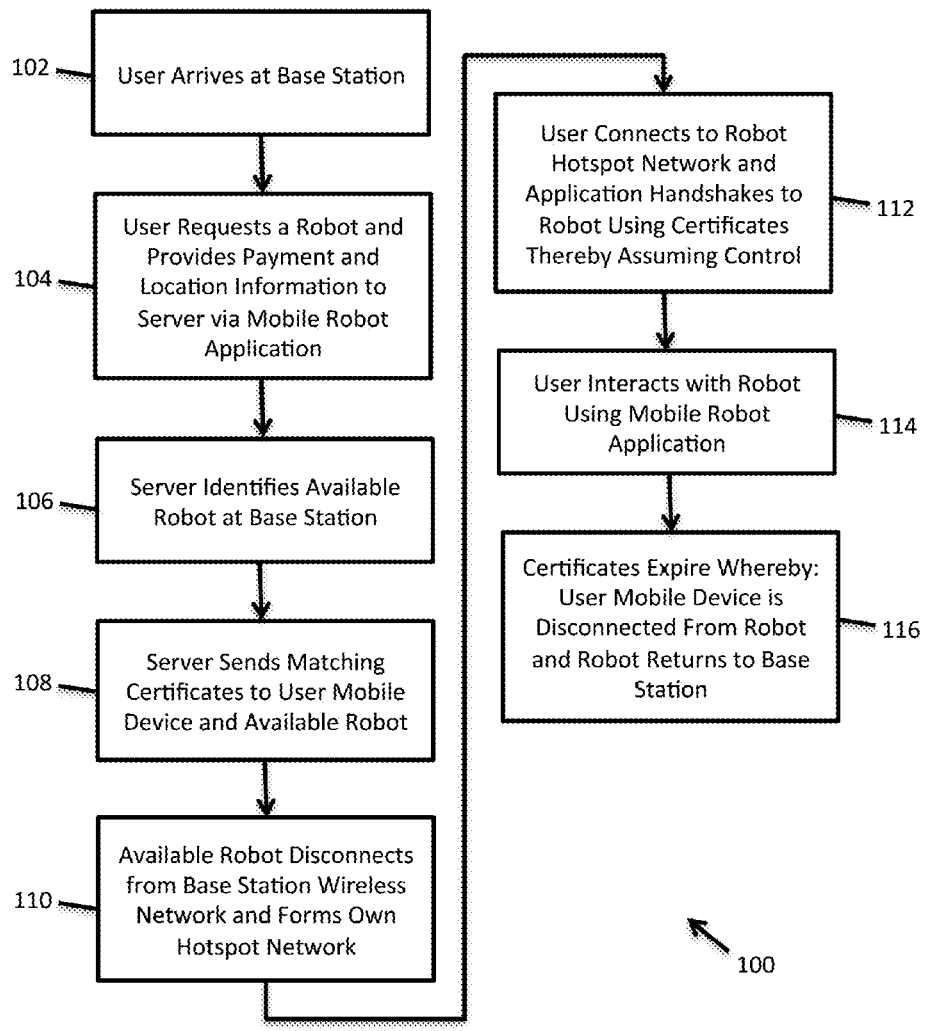
FIG. 8 is a flowchart representation of an exemplary method of user interaction with a robot.

FIG. 8 is a flowchart representing an exemplary method 100 by which a user takes control and utilizes robot 10. A venue such as a theme park or zoo has base stations 6 that house robots 10. (See FIG. 1) According to step 102, a user arrives at a base station 6 having robots 10.

According to step 104 the user utilizes the mobile robot application 12 to request a robot 10 and to input a payment to cloud server 8. The mobile robot application 12 and cloud server 8 thereby receive information from the user indicative of the location of base station 6 and the payment information.

According to step 106 the cloud server 8 identifies an available robot 10 in base station 6. According to step 108, the cloud server sends matching certificates to the mobile robot application 12 and to the identified available robot 10. The certificates have a certain time duration that define an available time period that the user can utilize robot 10.

According to step 110 robot 10 disconnects from base station 6 and forms its own hotspot network whereby the mobile robot application 12 can now directly communicate with robot 10 wirelessly. According to step 112 the mobile device 4 connects to the robot hotspot network. The mobile robot application 12 handshakes with the robot 10 using the matching certificates. The mobile robot application 12 thereby assumes control of robot 10.

According to step 114 the user interacts with the robot 10 using mobile robot application 12. According to step 116 the matching certificates expire when a time of use reaches the certificate expiration time. In response, the robot 10 wirelessly disconnects from the mobile device 4 and physically returns to base station 6. Robot 10 then wirelessly connects to base station 6.

According to one embodiment of step 114, the robot 10 is pre-programmed to lead and guide the user along a particular route through a venue. The robot 10 can be pre-programmed to stop and capture images at predefined locations along the route. The robot 10 can prompt the user by speaker 88 and/or mobile device 4 at such predefined locations. Additionally the user can request additional photo sessions in a manner similar to that described with respect to FIG. 9.

According to another embodiment of step 114, the robot 10 can follow a user but within a predefined and pre-programmed area. For example, the robot 10 may stay within a certain distance of the base station 6. Alternatively, the robot 10 may be pre-programmed to follow a finite number of specified routes with the user. If the user attempts to leave the predefined and pre-programmed area, the robot will provide warnings to the user. The warnings can be in the form of lights, sounds from speaker 88, and messages sent to the user's mobile device 4. If the user leaves the predefined and preprogrammed area, the robot 10 will automatically return to base station 6.

According to an alternative embodiment of step 104, the robot 10 may not require a payment from the user. Free use of the robot 10 may be part of the price of admission to the venue or it may be for promotional purposes for example.

In an alternative embodiment to method 100, a robot 10 may be programmed to operate autonomously without being requested by a user. An autonomous robot 10 may capture images when certain criteria are met. As one example, the robot 10 may capture authorized images of guests meeting certain criteria such as those requesting to have pictures taken. As another example, robot 10 can be part of a security patrol for a venue, capturing images of and identifying unauthorized subjects.

Figure 9:
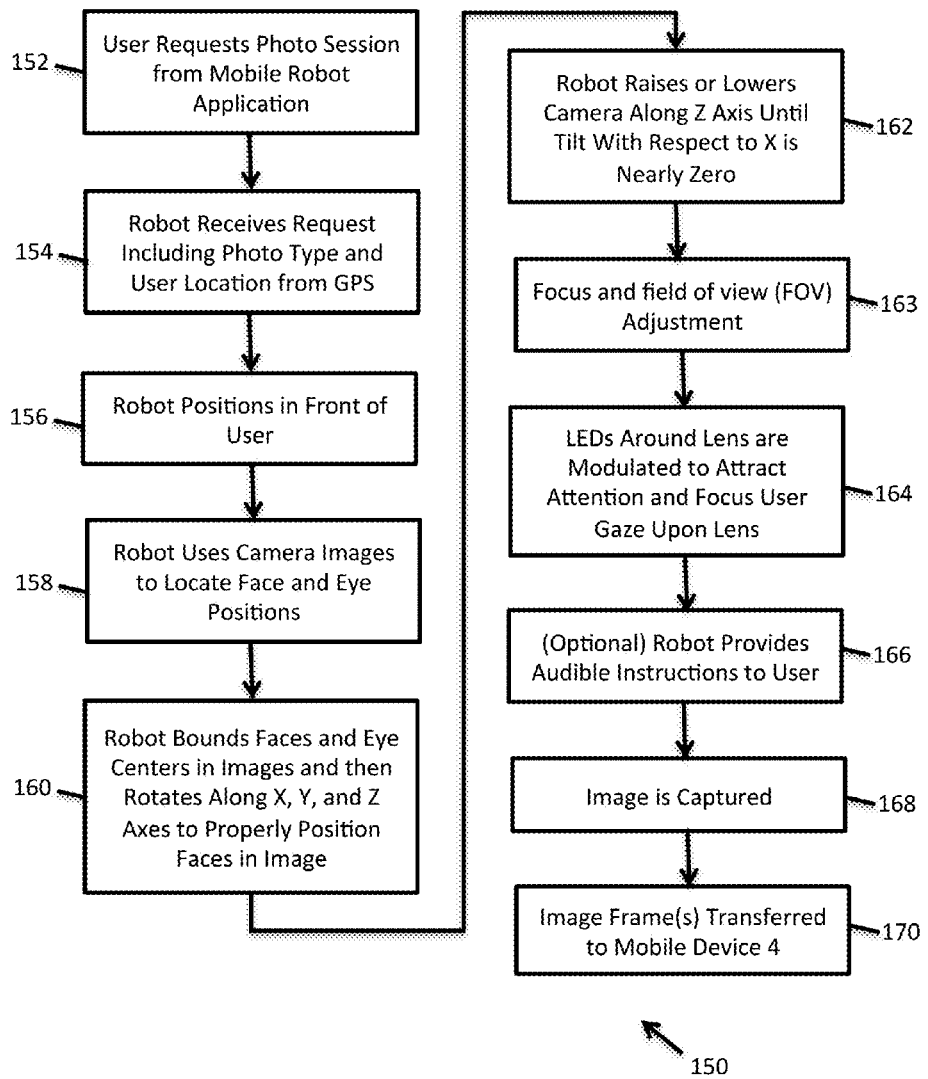
FIG. 9 is a flowchart representation of an exemplary method by which a robot captures an image.

FIG. 9 is a flowchart representing an exemplary method 150 by which a user utilizes robot 10 to capture an image containing the user and possibly companions. The captured image can be a single "still frame" or it can be a series of images or video frames. According to step 152 the user requests a photo session from the mobile robot application 12. At the same time, the user inputs information including factors such as the what type of image frame capture is to be performed. Examples include standard photo frames, square photos, panning landscape photos, standard video, slow-motion video, orbiting video, bursts of images to capture motion, close-up images or even combinations of capture types. In an alternative embodiment the robot 10 can utilize a default (non-user specified) photo type.

In various alternate embodiments of step 152 the user can request a photo session in other ways. In one embodiment a user can send an SMS text message from mobile device 4 to robot 10. In another embodiment a user can press a button on robot 10. In yet another embodiment a user can interact with a user interface such as a flat panel screen on robot 10. In a yet further embodiment, the robot 10 automatically begins a photo session when one or more criteria are met such as in response to detecting when one or more faces are stationary and/or smiling.

According to step 154 the robot 10 wirelessly receives the request from the mobile robot application 12 including information indicative of the image type or characteristics and a user location from the GPS of mobile device. According to step 156 the robot, utilizing user location information, positions itself in front of the user. In some embodiments the step 156 is not utilized because the user is "assumed" to be generally in front of the robot 10.

According to step 158 the robot captures images of the user to locate face and eye positions. Also according to step 158, the robot can capture images of the user's companions' faces and eyes.

According to step 160, the robot bounds the face(s) and eye center in images and then rotates the camera about the X, Y, and Z axes to properly position the face(s) in the image. Step 160 can take into account various user settings such as zoom level (i.e., how much of the image should encompass user face(s) versus background objects or landscapes). Optionally as part of step 160, the robot analyzes faces in the image and verifies whether predefined and/or authorized users are in the image.

Figure 10:
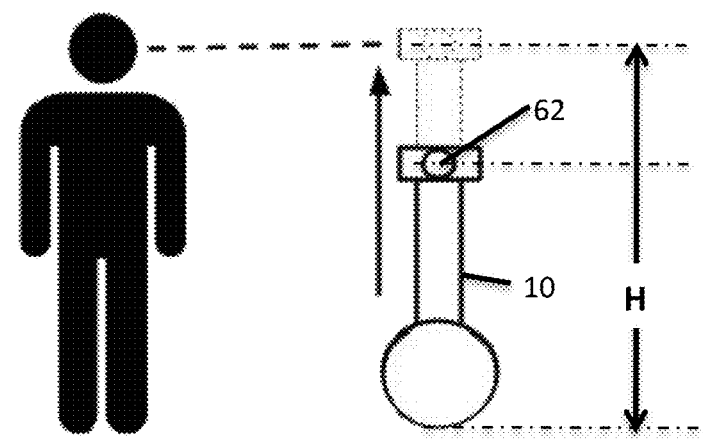
FIG. 10 is a schematic illustration of a robot raising a camera to a user's eye level.

According to step 162, the robot raises or lowers the camera along the Z-axis until the camera axis CA is horizontal or nearly horizontal. Generally speaking, the quality of a photograph of faces can be optimized if the camera lens is at approximately the same height. This is illustrated in FIG. 10 whereby the robot 10 raises camera lens 62 until the height H of the camera axis CA is even with the user's eye level or some other portion of the user's face. In an exemplary embodiment steps 160 and 162 occur simultaneously.

According to step 163, the robot 10 performs a focus and field of view adjustment. In one embodiment, the camera 18 changes a zoom and focal length. In a second embodiment, the robot 10 moves toward or away from the user generally along axis Y to adjust the field of view and the camera 18 adjusts a focus accordingly. In yet a third embodiment the field of view is adjusted by a combination of camera zoom adjustment and movement of the robot generally along the axis Y. Minimizing the zoom requirement for the camera 18 reduces the weight of the camera optics and tends to improve image quality.

According to step 164, the LED ring 66 is activated to attract the attention of the user and companions whereby they will focus their gaze upon camera lens 62. LED ring 66 or other geometries of LEDs 66 can also perform other functions such as providing "fill light" to improve captured image quality. According to optional step 166 the robot speaker 88 may also provide audible instructions to the user. According to step 168 the image frame(s) is/are captured. According to step 170 the image frames are transferred to the user's mobile device 4.

In an alternative embodiment to steps 152 and 154, the robot 10 initiates the photo session with the user. In an initial step the robot 10 can communicate to the user that a photo session is recommended. This communication can be via the audio speaker 88 on the robot 10 or through the user's mobile device 4. The user can then provide image type and other information to the robot 10 via mobile device 4. Remaining steps 156 to 170 can be similar to those described previously with respect to FIG. 9.

In an alternative embodiment to method 150 a user may request the use of multiple robots 10 to capture image frames. The robots 10 software can cooperatively coordinate the capture of image frames for video or still frame pictures. The robots 10 can capture image frames of the same subject at varying angles. When multiple robots 10 are simultaneously capturing video frames, the multiple recordings can be synchronized between the different robots 10. This allows the different video streams to be edited together. Video synchronization can be accomplished by time-stamping the image frames.

Figure 11:
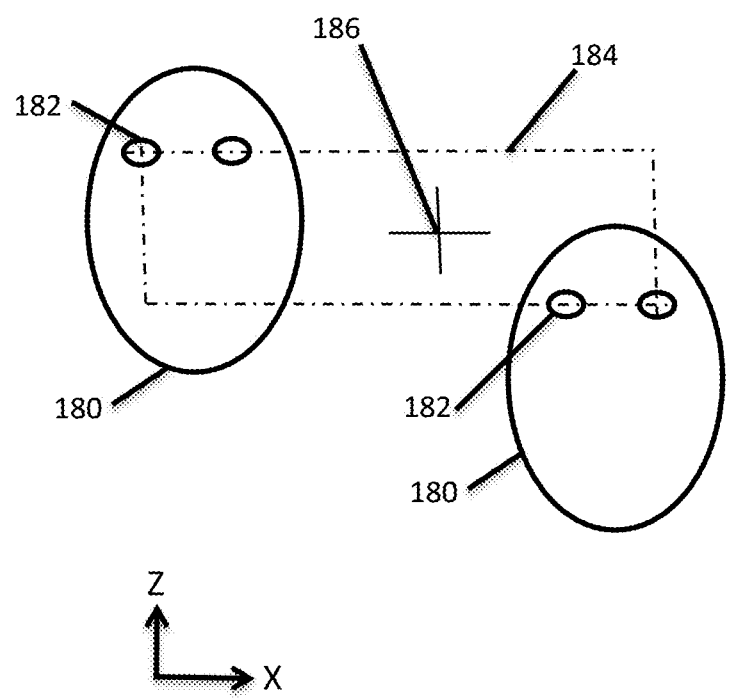
FIG. 11 is a schematic diagram illustrating a bounding box for selecting an intermediate or central point between users' eyes in an image frame.

FIG. 11 depicts the image capture, analysis, and motion performed by robot 10 relative to users faces 180 and eyes 182 which can be performed according to steps similar to steps 158, 160, and 162 of method 150. The camera can zoom and rotate camera lens 62 until all faces 180 are within the field of view of the camera. The camera analyzes the resultant image frame to determine the centers of eyes 182. From this a bounding box 184 can be defined that bounds all the eye 182 centers. The camera can then rotate about X, Y, and Z until the camera axis CA is directed toward an intermediate location 186 within the bounding box 184. Intermediate location 186 may be chosen to be at the geometric center of bounding box 184.

In one embodiment the analysis performed includes the recognition of facial features such as noses and mouths. This would help in recognizing objects as faces and, in some cases, in facial recognition of an individual in an image frame.

In an alternative embodiment the camera finds the centers of faces 180 rather than the centers of the eyes. Otherwise this embodiment is the same as that described with respect to FIG. 11. In this embodiment the bounding box 184 would extend around faces 180. A central or intermediate location 186 in bounding box 184 can then be determined.

Figure 12:
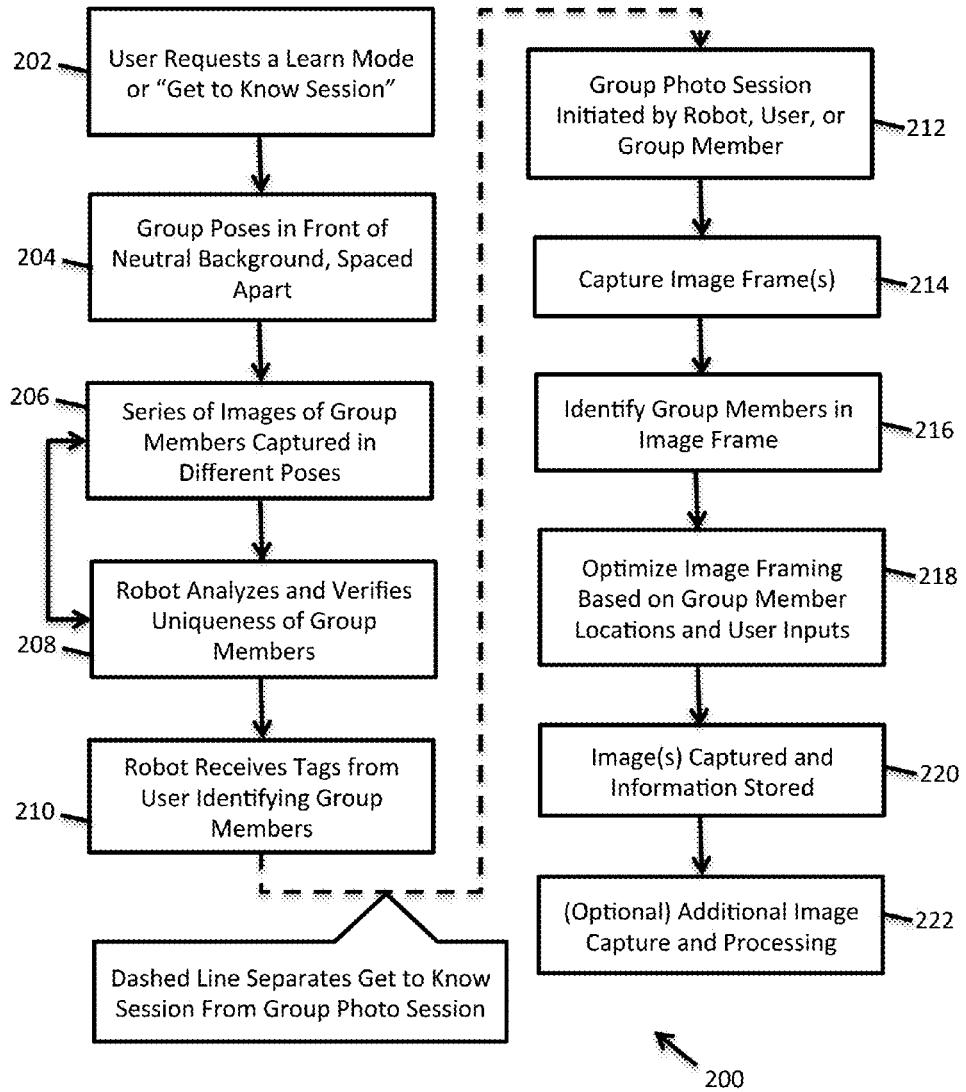
FIG. 12 is a flowchart representation of an exemplary method by which a camera captures images of group members and then utilizes the images to recognize the group members.

FIG. 12 is a flowchart representation of an exemplary process 200 whereby the robot 10 operates optimally for a group which consists of the user and the user's companions. According to step 202 the user requests a "get to know" session with robot 10. The "get to know" session is a learn mode whereby the robot 10 can create a database with group images and identities.

According to step 204 the group poses spaced apart in front of a neutral background. According to step 206 the robot captures one or more image frames of the group. The images may include different poses—e.g., front view and side views. According to step 208 the robot analyzes and verifies uniqueness of group members to assure an ability to effectively use facial recognition techniques later. As indicated by a double arrow connecting 206 and 208, these steps may repeat concurrently to allow robot 10 to develop a database sufficient to enable the facial recognition. In addition to faces, the robot can capture the color of subjects' clothing as an alternate means for the recognition of individual subjects. This is helpful if the subjects' faces are partially occluded and/or facial similarities cause the faces to be difficult to differentiate or recognize. In another embodiment the robot can capture other image and/or motion attributes to individually characterize each subject.

According to step 210, the robot 10 transfers the images of the group members to the user's mobile device 4 where the user can tag them. Also according to step 210, the tags are received by the robot 10. Thus, the robot now has data for the group members along with their tag identities. Optionally as part of step 210, group members mobile devices can be linked to robot 10 to enable group members to initiate photo sessions and perform other functions with robot 10.

Steps 202 to 210 are collectively referred to as the "learn mode" or "get to know session" procedure whereby the robot 10 has learned to identify the group members. Once this is done, steps 212 to 222 are possible whereby the robot 10 can use the information from the learn mode. Alternatively steps 212 to 222 can be performed if the robot has tagged facial information obtained a manner that is alternative to steps 202 to 210.

According to step 212 a group photo session is initiated. Initiation can be accomplished by the robot 10, the user, or a group member. According to step 214, robot 10 captures at least one image frame containing the group members. Step 214 may be performed with a relatively wide zoom and/or greater distance between robot 10 and the group members to assure that all of their images are captured.

According to step 216 the robot 10 identifies group member faces in the image frame(s). According to step 218 the robot 10 optimizes framing based on locations of group member faces and user inputs. Because the robot 10 recognizes the group member faces, extraneous other faces that may be within the image frame need not be considered in the process of framing.

According to step 220, robot 10 uses the optimized framing to capture images. Robot 10 stores the captured images along with the tags such that group member images are tagged. Also according to step 220 robot 10 can transfer the captured images to mobile devices 4 held by the group members.

During the process of performing steps 214-220 any or all of the techniques described with respect to FIG. 9 may be utilized that are useful for method 200. For example, the robot 10 can rotate camera 18 to bound the group members faces in a manner similar to that of step 160 in FIG. 9. Robot 10 can raise or lower the robot head 16 (with camera 18) whereby the camera axis CA is horizontal in a manner similar to that of step 162. The robot can focus and adjust the camera field of view (FOV) in a manner similar to that of step 163. The robot can modulate the LEDs in a manner similar to that of step 164.

According to optional step 222 the robot 10 may capture additional images that do not necessarily contain the group members and may perform additional image processing such as a removal of people and faces that are not part of the group. This can be done by performing a comparison between multiple images to determine which portion is part of a fixed background and which is a person moving in the image frame and to fill in missing data when the subtraction has occurred. Finally, according to step 222, the processed images can be stored and transferred to group members mobile devices 4.

Figure 13A:
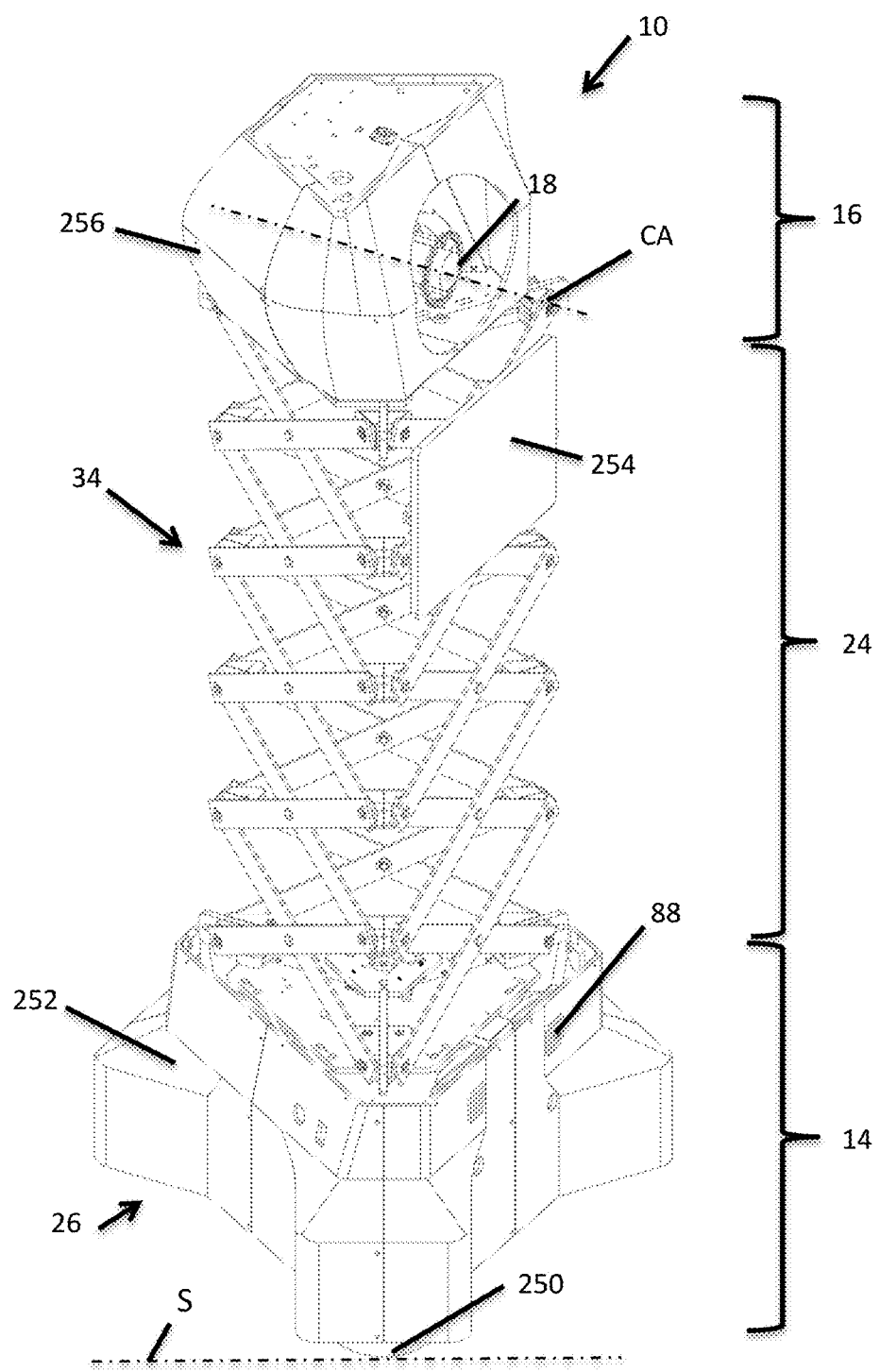
FIG. 13A is an isometric representation of a second exemplary embodiment of a robot for capturing image frames.
Figure 13B:
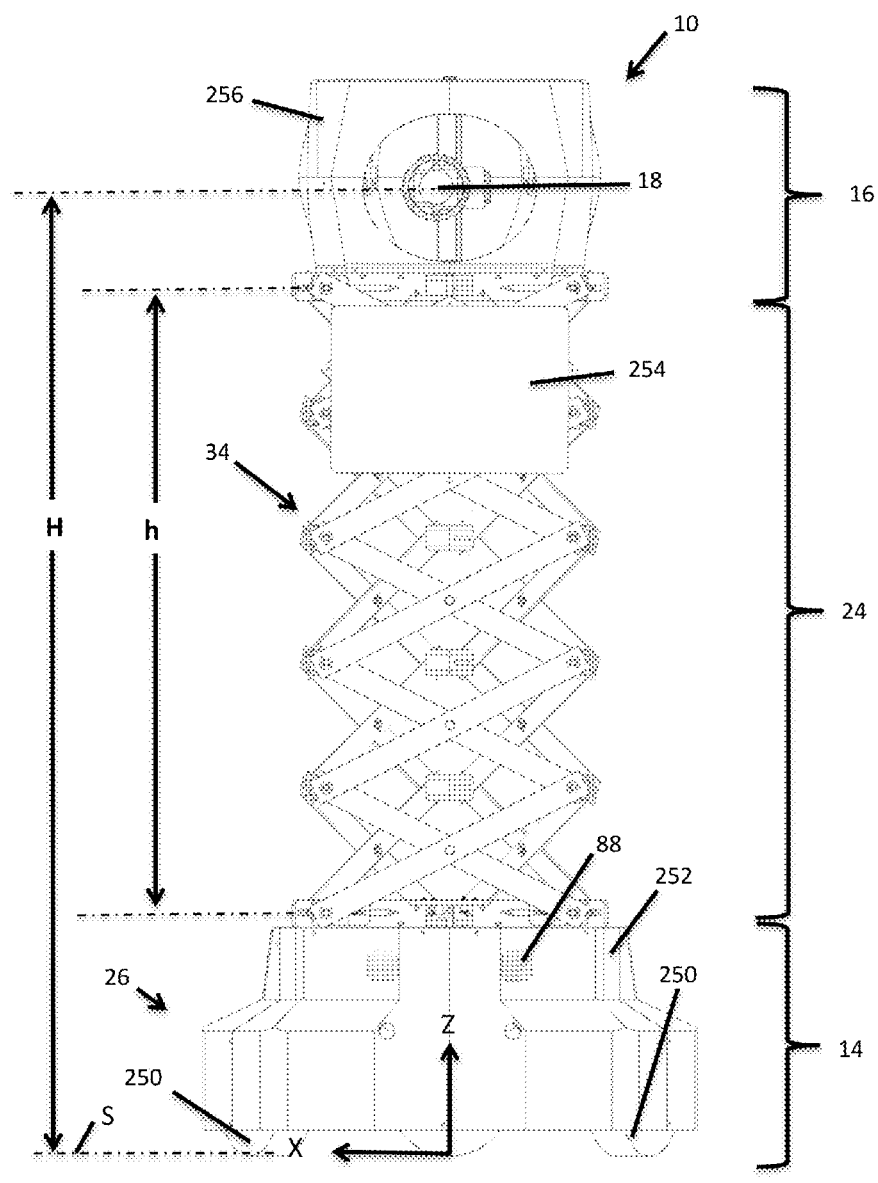
FIG. 13B is a front view of a second exemplary embodiment of a robot for capturing image frames.
Figure 13C:
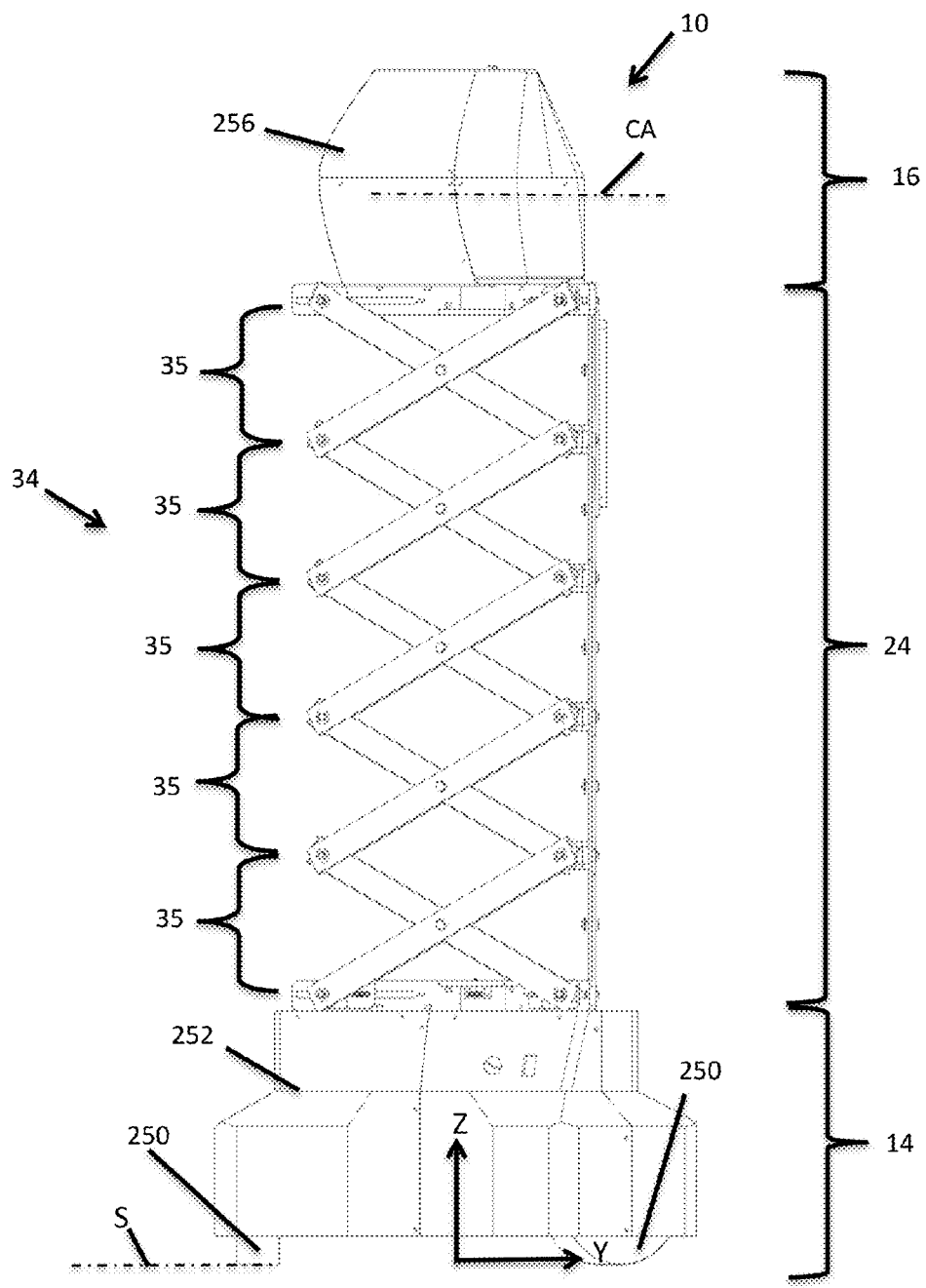
FIG. 13C is a side view of a second exemplary embodiment of a robot for capturing image frames.

FIGS. 13A, 13B, and 13C depict a second exemplary embodiment of a robot 10 for capturing images. Except where noted, like element numbers depict like features when comparing FIGS. 13A-C with those of FIGS. 3A-C. Thus in the discussion that follows typically the differences will be noted.

Base 14 includes three omni-directional wheels 250 (in place of ball 28) for providing transport of robot 10 in X and Y as well as rotation about axis Z. Base 14 also includes housing 252 for covering parts internal to base 14 such as the drive mechanism for omni-directional wheels 250. Base 14 also includes speakers 88. In alternative embodiments, speakers 88 can be positioned on vertical positioning mechanism 24 and/or robot head 16.

Vertical positioning mechanism 24 includes five scissor stages 35 as illustrated with respect to FIG. 13C. Also mounted upon the vertical positioning mechanism 24 is a touchscreen 254. This touchscreen 254 is represented in the electrical block diagram of previous FIG. 7 as human interface device 92.

The user can utilize touchscreen 254 to start a user session (see element 152 of FIG. 9) from the touchscreen 254 instead of mobile device 4. The touchscreen can also be used to display photos taken and to allow the user to select or delete a photo taken. The user can use the touchscreen 254 to send the photo to another device such as mobile device 4 or a printer. In one embodiment the user can type a phone number, email address, or other identifier directly onto touchscreen 254.

Robot head 16 includes a housing 256 for protecting camera 18 and other components. The camera 18 also includes an integrated microphone 20.

The specific embodiments and applications thereof described above are for illustrative purposes only and do not preclude modifications and variations encompassed by the scope of the following claims.

What we claim is:

1. A robot for capturing image frames in response to a request comprising:
    a base having a transport mechanism that controllably imparts motion and positions the robot along a lateral support surface;
    a robot head;
    a camera having a lens defining a camera axis;
    an angular positioning mechanism that couples the camera to the robot head and controllably adjusts a tilt of the camera axis about a horizontal axis that is perpendicular to the camera axis;
    a vertical positioning mechanism that couples the robot head to the base, the vertical positioning mechanism controllably adjusts a vertical distance between the robot head and the support surface along a vertical axis that is orthogonal to the horizontal axis; and
    a control system that controls:
        image capture of the camera;
        the transport mechanism to thereby determine lateral positioning and rotation about a vertical axis;
        the angular positioning mechanism to thereby determine the tilt of the camera axis relative to a horizontal axis; and
        the vertical positioning mechanism to thereby determine a distance between the robot head and the base.

2. The robot of claim 1 wherein the vertical positioning mechanism can vary the distance between the base and the robot head by a multiplication factor of at least two between a first distance value and a second distance value in which the second distance value is at least two times the first distance value.

3. The robot of claim 1 wherein the vertical positioning mechanism can vary the distance between the base and the robot head by a factor of at least five between a first distance value and a second distance value in which the second distance value is at least five times the first distance value.

4. The robot of claim 1 wherein the vertical positioning mechanism includes a scissor mechanism including a plurality of connected scissor links whereby a relative angular rotation of the scissor links determines the vertical distance between the robot head and the base.

5. The robot of claim 4 wherein each scissor link includes a pair of opposing ends and further comprising a plurality of vertex members, each vertex member is joined to the ends of at least two of the scissor links.

6. The robot of claim 5 wherein the plurality of vertex members includes a plurality of driven vertex members, each driven vertex member is coupled to the ends of two different scissor links whereby synchronous linear motion of the vertex members imparts the angular rotation of the scissor links.

7. The robot of claim 6 wherein the vertical positioning mechanism includes a pulley system that drives the synchronous linear motion of the vertex members under control of the control system.

8. The robot of claim 6 wherein the plurality of vertex members includes a plurality of intermediate vertex members, each intermediate vertex member is coupled to the ends of four different scissor links.

9. The robot of claim 6 wherein the plurality of driven vertex members includes three driven vertex members whose synchronous vertical motion is along axes that vary by 120 degrees from each other.

10. The robot of claim 4 wherein the scissor mechanism defines a prismatic shape that having at least three surfaces.

11. The robot of claim 4 wherein the scissor mechanism defines a shape of a triangular prism.

12. The robot of claim 1 further comprising a touchscreen to enable user inputs to the robot.

13. The robot of claim 12 wherein the touchscreen is mechanically coupled to the vertical positioning mechanism.

14. The robot of claim 1 wherein the angular positioning mechanism further controllably adjusts one or more of the pan of the camera about a vertical axis and the roll of the camera about the camera axis.

15. The robot of claim 1 wherein the controller is responsive to a request to initiate a photo session, the request originates from one or more of (1) a wireless command from a mobile device, (2) an input to user interface attached to the robot, (3) an input to a touchscreen attached to the robot, and (4) in response to a signal from the camera.

16. The robot of claim 1 wherein the controller is responsive to an image of one or more human faces captured by the camera, the controller responds by adjusting the vertical distance between the camera axis and the base whereby the camera axis is substantially horizontal during image capture.

17. A robot for capturing image frames in response to a request comprising:
    a base having a transport mechanism that controllably positions the robot along a lateral support surface;

a robot head including a camera having a lens defining a camera axis;

an angular positioning mechanism that couples the camera to the robot head and controllably adjusts a tilt of the camera axis about a lateral axis that is perpendicular to the camera axis;

a scissor lift mechanism that couples the robot head to the base and adjusts a vertical distance between the base and the robot head whereby the vertical distance can be varied by at least a factor of two; and a control system that controls:
  image capture of the camera;
  the transport mechanism to thereby determine lateral positioning and rotation about a vertical axis;
  the angular positioning mechanism to thereby determine the tilt of the camera axis relative to a horizontal axis; and
  the scissor lift to adjust the vertical distance between the robot head and the base.

18. The robot of claim 17 wherein the scissor lift can vary the vertical distance between the base and the robot head by at least a multiplication factor of five between a first distance value and a second distance value in which the second distance value is at least five times the first distance value.

19. A robot for capturing image frames in response to a request comprising:

a base having a transport mechanism that controllably positions the robot along a lateral support surface;

a robot head including a camera having a lens defining a camera axis;

an angular positioning mechanism that couples the camera to the robot head and controllably adjusts a tilt of the camera axis about a horizontal axis that is perpendicular to the camera axis;

a scissor lift mechanism that couples the robot head to the base and adjusts a vertical distance between the base and the robot head whereby the vertical distance can be varied by at least a factor of two, the scissor lift mechanism being constructed of a vertical assembly of scissor stages in which each scissor stage has three pairs of scissor links; and a control system that controls:
  image capture of the camera;
  the transport mechanism to thereby determine lateral positioning and rotation about a vertical axis;
  the angular positioning mechanism to thereby determine the tilt of the camera axis relative to a horizontal axis; and
  the scissor lift to adjust the vertical distance between the robot head and the base.

20. The robot of claim 19 wherein the scissor lift can vary the vertical distance between the base and the robot head by at least a multiplication factor of five between a first distance value and a second distance value in which the second distance value is at least five times the first distance value.

* * * * *